(12) United States Patent
Spiegl et al.

(10) Patent No.: US 7,703,103 B2
(45) Date of Patent: Apr. 20, 2010

(54) SERVING CONCURRENT TCP/IP CONNECTIONS OF MULTIPLE VIRTUAL INTERNET USERS WITH A SINGLE THREAD

(75) Inventors: Helmut Spiegl, Linz (AT); Ernst Ambichl, Altenberg (AT); Bernd Greifeneder, Linz (AT)

(73) Assignee: Borland Software Corporation, Rockville, MD (US)

( * ) Notice: Subject to any disclaimer, the term of this patent is extended or adjusted under 35 U.S.C. 154(b) by 1194 days.

(21) Appl. No.: 10/678,734

(22) Filed: Oct. 2, 2003

(65) Prior Publication Data

US 2004/0199571 A1    Oct. 7, 2004

Related U.S. Application Data

(60) Provisional application No. 60/430,309, filed on Dec. 2, 2002.

(51) Int. Cl.
*G06F 9/46* (2006.01)
*G06F 15/16* (2006.01)
*G06F 9/00* (2006.01)

(52) U.S. Cl. ............... 718/106; 709/201; 719/314; 719/318

(58) Field of Classification Search ........... 719/314, 719/318; 718/100, 106; 709/201
See application file for complete search history.

(56) References Cited

U.S. PATENT DOCUMENTS

| | | | | |
|---|---|---|---|---|
| 5,237,662 A | * | 8/1993 | Green et al. | 718/100 |
| 6,212,573 B1 | * | 4/2001 | Lim et al. | 719/315 |
| 6,226,689 B1 | * | 5/2001 | Shah et al. | 719/314 |
| 6,324,492 B1 | * | 11/2001 | Rowe | 703/13 |
| 6,665,379 B1 | | 12/2003 | Brown et al. | |
| 6,687,729 B1 | | 2/2004 | Sievert et al. | |
| 7,051,330 B1 | * | 5/2006 | Kaler et al. | 718/106 |
| 2003/0035409 A1 | | 2/2003 | Wang et al. | |
| 2005/0108710 A1 | * | 5/2005 | Patiejunas | 718/100 |

FOREIGN PATENT DOCUMENTS

WO    WO 01/86446    11/2001

OTHER PUBLICATIONS

International Search Report for PCT/US03/38451, May 11, 2004, 5 pages.

* cited by examiner

*Primary Examiner*—Li B Zhen
*Assistant Examiner*—Phuong N Hoang
(74) *Attorney, Agent, or Firm*—Kokka & Backus, PC

(57) ABSTRACT

A method for facilitating network communications from one or more independent execution threads by a dedicated worker thread. Because an operating system is not designed for use with a large number of threads, such a system requires the use of multiple computers for simulating a large number of virtual users. This increases complexity, as well as cost. The present invention reduces the number of threads needed, which reduces resource needs, and in turn increases the number of virtual users that can be simulated. According to the present invention, a worker thread uses non-blocking function calls to efficiently handle requests for network operations.

14 Claims, 4 Drawing Sheets

SERVING CONCURRENT TCP/IP CONNECTIONS OF MULTIPLE VIRTUAL INTERNET USERS WITH A SINGLE THREAD

This patent application claims the benefit of priority under 35 U.S.C. 119(e) from U.S. Provisional Patent Application Serial No. 60/430,309, filed Dec. 12, 2002, entitled "SERVING CONCURRENT TCP/IP CONNECTIONS OF MULTIPLE VIRTUAL INTERNET USERS WITH A SINGLE THREAD", which is hereby incorporated by reference as if set forth in its entirety herein.

FIELD OF THE INVENTION

This invention relates generally to computing systems, and more specifically to the testing of servers or other distributed or networked computer systems.

BACKGROUND OF THE INVENTION

The wide adoption of the Internet, and networked computing in general, has resulted in the proliferation of computer servers. A server can be generally defined as a computer that provides services to other computers over a network. Among a server's many uses are the distribution of web pages, e-mail messages, files, electronic newsgroups and the support of multi-user virtual environments.

Evaluating a server's performance will usually depend on the nature of the server and the particular purpose it is used for. In the case of the Internet, one of the primary purposes of an In reality, commonly used CPU's do not execute more than one thread or process at the same time. They just create that illusion by quickly switching between threads or processes. When a CPU switches between two threads or processes, it must execute a context switch, which means that it must replace all the data and instructions associated with the old thread or process with those associated with the new thread or process. Threads, however, have very little data that is unique to them, they usually share the process data with the other threads of the same process. Thus, switching between different threads in a single process is less resource consuming than switching between different processes, since switching between different threads of the same process requires the replacement of smaller amounts of data. So a single application can run several tasks as threads concurrently, without incurring the higher context switching costs of running several processes concurrently.

Server testing software often takes advantage of the multitasking capabilities of an OS by simulating each virtual user as a different process. An ordinary internet user engaged in usual internet activity, such as web browsing, will probably use several threads that make network calls. Thus, it would be accurate to simulate such a user by a process that contains several threads, each creating a network connection to the server.

Most commonly used operating systems are engineered to provide high performance for relatively small numbers of threads and processes. However, good server testing software should be able to simulate thousands of virtual users on a single machine. This would result in thousands of threads, which a commonly used OS may not be able to handle efficiently. Internet server is to process a large number of requests coming from a large number of different computers or users.

When a server approaches its maximum load it tends to slow down significantly. Thus, when a server accepts too many requests from too many users, it increases the time needed to process each request. As a result, all users experience degraded quality of service. For this reason it is very important for server administrators and network administrators, as well as software developers, to be able to choose and configure their servers in a way that enables them to handle foreseeable loads without significant service degradation.

One of the best ways to determine a server's performance capabilities is to test it. Testing is usually performed by simulating the environment of users and computers that are meant to be served by a server. While a server may be required to serve many thousands of users, using thousands of computers to simulate these users is usually impracticable. Thus, for testing purposes many users are simulated using a single or a small number of testing or simulation computers. These simulation computers run testing software, which is designed to simulate many users or computers that are making requests to, or generally exchanging information with the server. Usually these simulated users are called virtual users.

Testing software usually utilizes a multitasking Operating System (OS) and CPU. Most modern multitasking OS's support both process and thread multitasking. A thread is the basic unit of program execution. It includes a list of instructions that is treated by the processor as a single sequential flow of control. A process on the other hand is a larger unit of program execution, that may contain several threads. At any time a computer may be executing several processes concurrently and several threads within each process.

SUMMARY OF THE INVENTION

The present invention is directed to a system and method of increasing the efficiency of a program for testing servers or other multi-user computer systems. The increase in efficiency is achieved by generating the network traffic of many virtual users with only a single thread. That is made possible by the removal of blocking calls from the virtual user code and by the use of a worker thread model for processing the communication requests of the TCP/IP traffic of the virtual users.

A blocking call is a function call made by a thread that invokes a function that is outside of that thread. The function in question is usually an OS function. Another aspect of the blocking call is that thread execution is halted until the function finishes execution. An example of a blocking call that often comes up in server testing programs is a TCP/IP call, designed to send or receive some information over a network, or establish a connection over a network. Blocking calls will usually take a long time to process, measured in CPU cycles, and thus cause inefficiencies. The delay may be partially avoided by stopping the processing of threads that are waiting for blocking calls and instead continuing execution of threads that are not waiting, but even such switches have delay costs associated with them, and those costs are high in the server testing environment, where thousands of threads may run on one machine. Without blocking calls, the present invention is able to create several connections per virtual user, while using a single thread to serve all connections of many virtual users. Since all connections of the virtual users are simulated on a single thread, all the virtual users as well as all other functionality of the server testing software can be implemented as multiple threads on a single process. This significantly decreases the number of context switches between different processes and threads. The fact that all the network traffic of the virtual users is handled by a single thread, almost eliminates the connection related context switches.

It should be noted that regardless of the fact that all the network connections of all virtual users are handled by a single thread, there still exist separate virtual user threads that run non-network virtual user simulation code, and supervise the network connections associated with each virtual user.

The present invention uses a feature typically found in commonly used operating systems. This feature is the non-blocking function call which has essentially the same functionality as the blocking function call, with one significant difference. When a thread calls the non-locking function call the thread will not stop execution, as it would have if it had called the blocking function call. Instead, the thread will continue to execute, while the non-blocking function call is pending or being processed somewhere else. When the non-blocking code finishes execution it will store a notification of completion as well as the associated return values of the call, if any, at a location that can be accessed by the thread. The thread must be able to handle such notifications. Non-blocking calls are sometimes referred to as asynchronous calls or over-apped calls.

According to the present invention, blocking calls are removed from the user simulation code and replaced with non-blocking abstracted requests to a separate dedicated module. The module handles these requests, by initiating non-blocking or asynchronous TCP/IP calls. The module also receives and processes the asynchronous notifications indicating the completion of the calls. When the module determines a request is complete, it alerts the virtual user thread that initiated the request of the request's completion, and returns to that thread any return value that is available.

Not all blocking calls must be removed. It is possible to program the module in such a way that it handles only certain blocking calls, preferably the ones that cause most performance difficulties.

BRIEF DESCRIPTION OF THE DRAWINGS

The foregoing and other features of the present invention will be more readily apparent from the following detailed description and drawings of the illustrative embodiments of the invention wherein like reference numbers refer to similar elements and in which.

DETAILED DESCRIPTION OF THE ILLUSTRATIVE EMBODIMENTS

Figure 1:
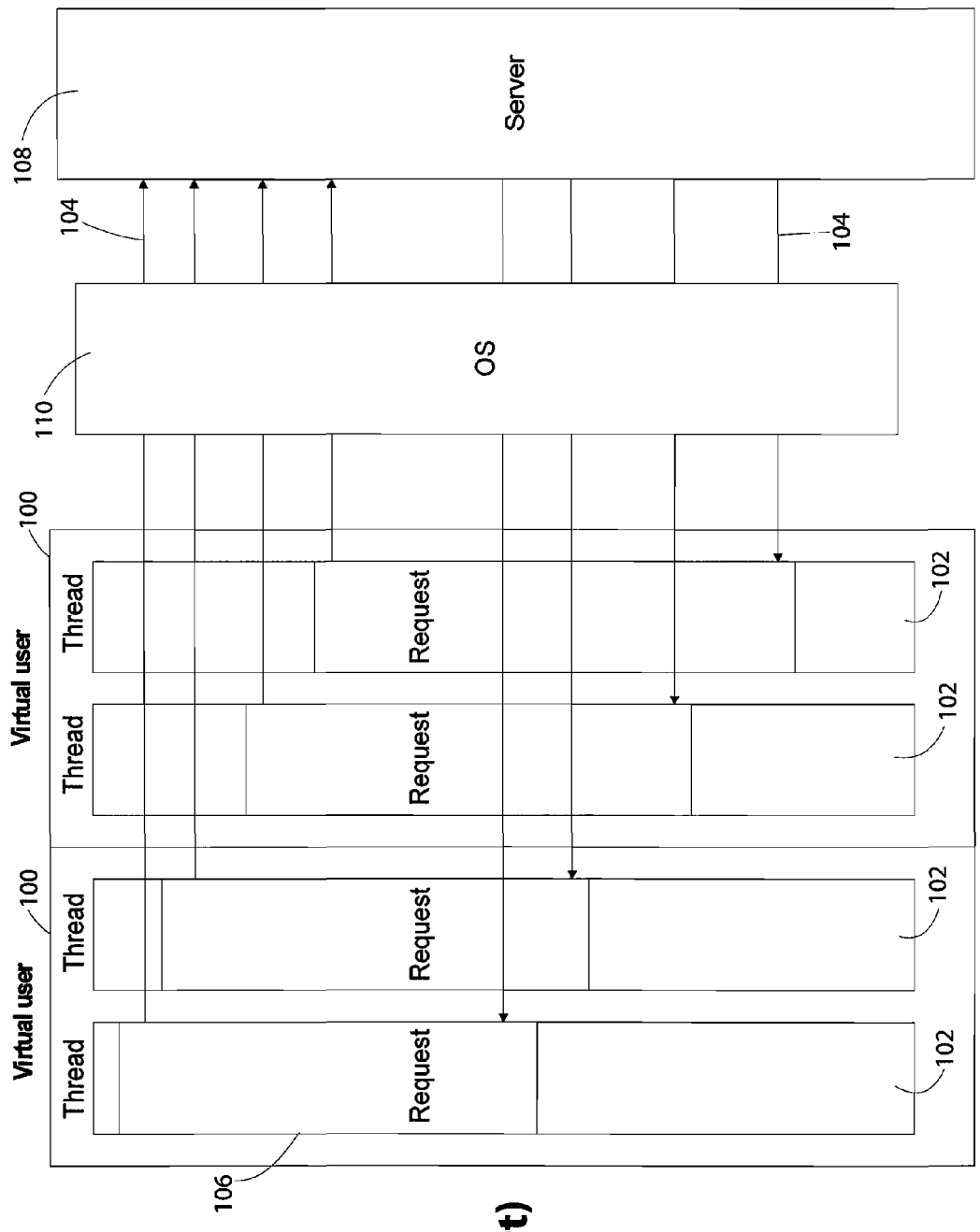
FIG. 1 is a block diagram of a prior art implementation of a server testing system.

FIG. 1 illustrates a prior art implementation of a server testing system and software. The testing software creates multiple virtual users 100. Each virtual user is simulated as a different process. Only two virtual users are shown, but there may be thousands. Each virtual user process may contain several threads 102. Each of these threads includes blocking requests 106 for network communication with the server 108 which create a TCP/IP connection 104 with the server 108. The TCP/IP connections are implemented through the operating system 110. Each thread 102 creates one connection, and thus, a virtual user creates several threads which in turn create several connections.

A disadvantage of the prior art implementation is that effective server testing software must support thousands of virtual users, each virtual user containing several TCP/IP connections. If each TCP/IP connection is represented by a single thread, the number of threads may overwhelm the computer on which the server testing software is being run. Furthermore, blocking TCP/IP calls tend to cause context switches. The prior art implementation involves thousands of threads that each frequently make blocking TCP/IP calls. The resulting high rate of context switches is likely to significantly degrade performance.

Figure 2:
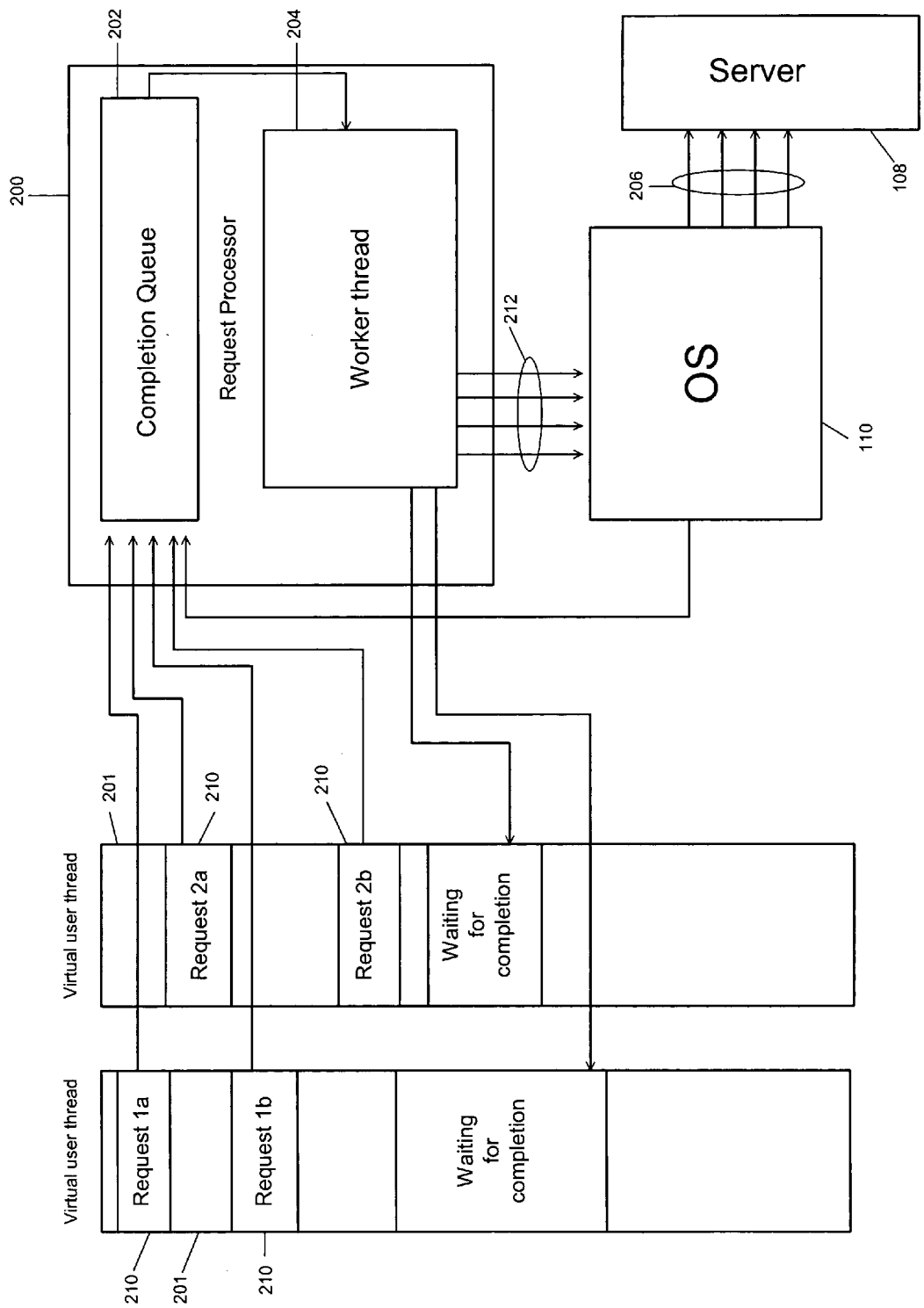
FIG. 2 is a block diagram of the request processor of the present invention.

FIG. 2 illustrates an embodiment of the server testing system of the present invention. In accordance with the present invention, a queue 202 is used to process thread requests. A queue is a data structure that operates on the FIFO (first in first out) principle. Items are removed from the queue in the order in which they were placed. An item will not be removed until all items that were placed before it are removed. As used herein, the term enqueue will mean to add an item to the queue. The term dequeue will mean to remove an item from the queue.

In this embodiment, a request processor 200 is used to handle all TCP/IP calls. The request processor includes a completion queue 202 and a worker thread 204. Each virtual user is simulated as a separate single thread 201. The virtual users do not make TCP/IP requests directly to the operating system. Instead, they create request objects 210 and enqueue the request objects in the completion queue 202 within the request processor 200. The worker thread 204 processes the request objects 210 in the completion queue 202, by making the actual TCP/IP calls 212 to the OS 110. The OS 110 in turn creates multiple TCP/IP connections 206 with the server 108. When a particular TCP/IP call is finished, the OS 110 notifies the request processor 200 by enqueueing a notification of completion in the completion queue 202. The notification of completion contains a reference to the request object, for which the TCP/IP call was made. The worker thread 204 within the request processor 200 eventually dequeues the notification of completion. The worker thread 204 then processes the notification of completion. This processing will be described in more detail below. When all the TCP/IP operations associated with a request object are completed the worker thread 204 will notify the virtual user thread 201 that initiated the request object, that the request is complete and will send the virtual user thread any return information that is available. Return information may include various operation codes, error codes, or data received from the server.

This embodiment of the invention utilizes an operating system feature such as, for example, the Microsoft Windows overlapped IO mechanism, which allows one thread to asynchronously support many concurrent TCP/IP connections. The way this feature is used can be seen in FIG. 3, where the request processor is shown in greater detail. The completion queue 202, which is found, for example, in the Microsoft Windows OS, is used by the OS to store notifications of completion of asynchronous operations. In this embodiment of the invention, the completion queue also stores TCP/IP requests from the virtual users.

When a virtual user thread 201 needs to make a TCP/IP request 300, the request is not sent directly to the OS, instead a request object 304 or 306 is created. The request object 304 or 306 is a data structure which typically contains the following elements: information identifying the virtual user thread that created that object, information that describes the nature of the request, the state of the request and some space for return value information that is unused at this point. Once the request object is created, the virtual user thread enqueues the object in the completion queue 202.

The request objects 304, 306, etc. in the completion queue 202 are processed by the worker thread 204, which dequeues an item from the completion queue 202, processes it, and moves on to the next item. When the worker thread 204 dequeues a request object, it usually makes an asynchronous TCP/IP call. The parameters of the TCP/IP call will depend on the information in the request object. For example if the request object indicates that some data needs to be sent to the server, the worker thread will make the corresponding call to send that data. The TCP/IP call will also include a reference (usually a pointer) to the request object, for which the call is made. Because the TCP/IP call is asynchronous, the worker thread need not wait for the call to complete. Instead, the worker thread moves on to the next item in the queue.

When the operating system 110 receives a TCP/IP call from the worker thread 204, it executes that call, by sending and/or receiving data from the server 108 through TCP/IP connections 206. After the execution is complete the OS 110 enqueues a completion notification, containing a reference to the request object, into the completion queue 202. This completion notification also contains return values and error codes if applicable. Examples of such completion notifications, enqueued by the OS, in FIG. 3 are the "send finished notification" 308, 310 and the "receive finished notification" 312, 314.

Figure 3:
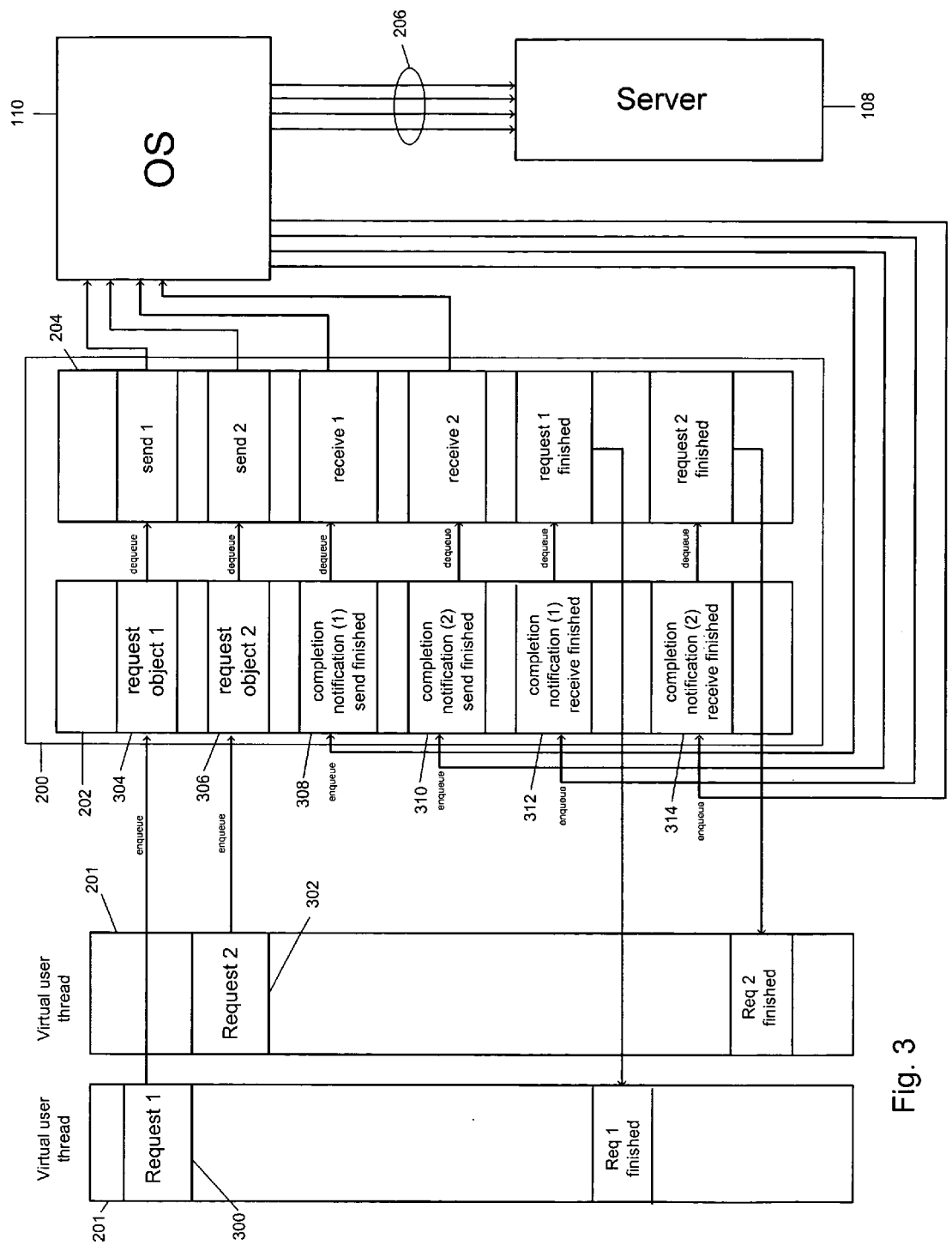
FIG. 3 is a block diagram of the request processor of the present invention.

In FIG. 3 two virtual user threads 201 make requests 300 and 302, respectively, to communicate information with the server. Each virtual user creates a request object (304 and 306, respectively) and sends it to the completion queue 202. Each request object indicates that a send and receive is requested, and includes the data to be sent. The worker thread 204 dequeues these request objects according to the order in which they were enqueued and invokes a TCP/IP call for each object, by executing the appropriate OS function(s). When making a TCP/IP call, the worker thread 204 provides a reference to the request object with the TCP/IP call. When the send operations are completed the operating system 110 enqueues in the completion queue notifications of completion for each send operation. Each notification contains the reference to the request object, which was previously provided with the TCP/IP call. Subsequently the worker thread 204 dequeues completion notification 308, which contains a reference to request object 304 (labeled in FIG. 4 as "request object 1"). It discovers that the send for this object has been completed, so it changes the state of request object 304, to indicate that the particular send operation has been completed, and it executes the next TCP/IP operation in the request object—the receive. The worker thread then proceeds to dequeue the next item in the queue 202—completion notification 310 (containing a reference to request object 306). The worker thread once again determines that the send for object 306 is completed so it changes the state of the referenced request object 306 to indicate the send was completed. By examining object 306 the worker thread determines that a receive still needs to be completed so it executes a receive for object 306 and goes back to the completion queue.

After the operating system 110 processes each of these receive operations, it once again enqueues new completion notifications 312 and 314, that reference objects 304 and 306 respectively, back into the queue. The worker thread 204 dequeues completion notification 312 and by examining the request object 304, referenced in completion notification 312, determines that the entire request is finished for that request object. The worker thread 204 then notifies the virtual user thread that initiated request object 304 that the request has been completed and sends to this virtual user thread any return information. Return information can be sent directly to the virtual user or by embedding that information in request object 304, which the virtual user can access. The worker thread then dequeues the next item on the queue, which is notification of completion 314. The worker thread determines that request object 306, referenced in that notification, is complete as well, so it similarly notifies the virtual user thread that initiated that request of the completion and sends this virtual user thread any available return information. It should be noted that objects 304 and 306 have their states changed by the worker thread as various TCP/IP operations are performed. The request objects are generally used by the worker thread to store the state and other information associated with the corresponding requests.

Figure 4:
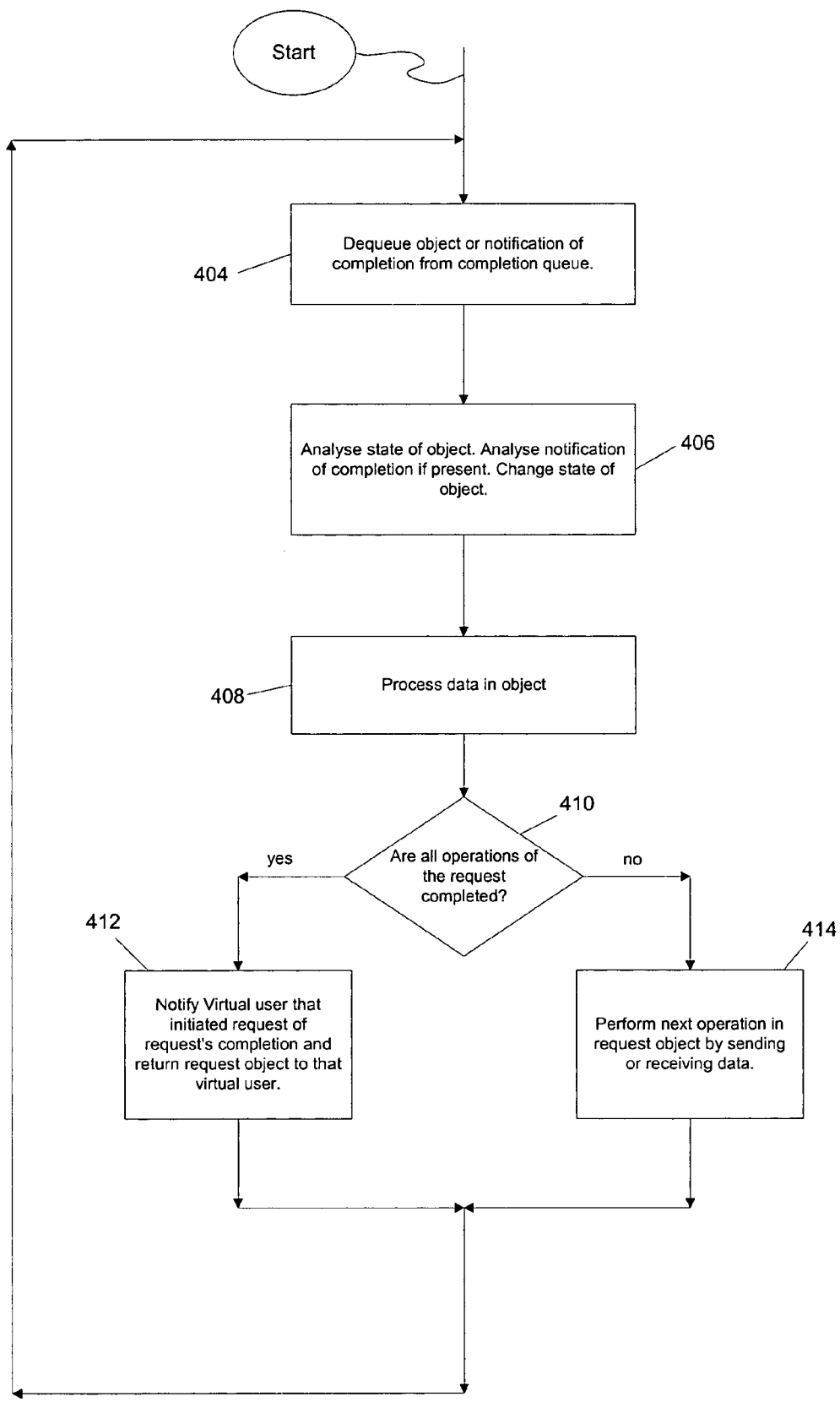
FIG. 4 is a flowchart of the operation of the worker thread.

FIG. 4 shows in detail the operation of the worker thread 204. First, at step 404 the worker thread 204 dequeues an item from the completion queue. The dequeueing is performed using a blocking function call. If the completion queue is empty, the blocking function will wait until an item is enqueued in the completion queue. Thus the worker thread 204 will stop execution if the completion queue 202 is empty, and not start again until a virtual user thread 201 or the OS 110 enqueues an item into the completion queue 202. Next, at step 406 the worker thread analyzes the item dequeued. The item can either be a request object sent from a virtual user 201, or a completion notification sent from the OS 110 that references a request object. If the item is a completion notification, at this step the worker thread updates the referenced request object to indicate that a TCP/IP operation has been completed and adds any data present in the notification of completion that may be relevant. Such data may include data sent from the server, error information, time stamps, etc. At step 408 the worker thread processes the data in the object. The data referred to here may include the data that is meant to be sent to the server or the data that is meant to be received from the server. The processing step determines whether a receive operation has resulted in the receipt of all necessary data. If the object has already had a receive operation performed on it during a previous pass through the worker thread, the worker thread will not treat the receive operation as finished until it checks the data that was received and ascertains that all the data needed was received. If this is not the case, the worker thread will schedule another receive operation to be performed on that object. At step 410, the worker thread determines if all the operations needed to fulfill the request for which the request object was created, are completed. If this is true, the worker thread moves on to step 412. At step 412, the worker thread notifies the virtual user that originated the request that the request has been completed and sends the virtual user the request object (or alternatively directly sends the virtual user all returned data). After step 412, the worker thread returns to step 404 to dequeue another item from the queue. Alternatively, if at step 410 it is determined that not all of the operations needed to fulfill the request for which the request object was created are completed, the worker thread moves on to step 414. At step 414 the worker thread asynchronously performs the next uncompleted operation listed in the request object. This can be either sending or receiving data. In certain cases it may include other operations, such as opening a TCP/IP connection, closing a TCP/IP connection, etc. After performing the next operation in the request object, the worker thread returns to step 404 to dequeue the next item from the queue.

It should be noted that objects or other data structures may be represented by pointers, or other references to those objects or data structures, a technique commonly used in the art. Consequently, when reference is made to objects or other data structures being moved, sent or returned, it does not necessarily imply that those data structures are moved in physical memory. The term operating system may include any library or module that provides TCP/IP or other network functionality, such as the Microsoft Winsock libraries. The illustrative embodiments use the TCP/IP protocol, but the present invention may be adapted to other network protocols.

While the foregoing description and drawings represent illustrative embodiments of the present invention, it will be understood that various changes and modifications may be made without departing from the spirit and scope of the present invention.

The invention claimed is:

1. A method for facilitating network communications from one or more virtual user threads, comprising steps of:
   storing a request object generated by one or more virtual user threads in a data structure, each of the one or more virtual user threads simulating a computer that is communicating with a server and configured to generate and then insert request objects into the data structure, the request object describing a request for an outgoing network operation and having state information;
   retrieving the request object from the data structure by a dedicated worker thread, the dedicated worker thread being different from the one or more virtual user threads and configured to process the outgoing network operation described by the request object;
   modifying the request object by the dedicated worker thread to indicate a change of state;
   sending a non-blocking function call from the dedicated worker thread to a networking module;
   sending the request object from the dedicated worker thread to the networking module;
   executing the non-blocking function call to the networking module; and
   storing a notification of completion in the data structure by the networking module, wherein the notification of completion corresponds to the request object.

2. The method of claim 1 further including the step of retrieving the notification of completion by the dedicated worker thread from the data structure.

3. The method of claim 2 further comprising the steps of:
   retrieving the request object corresponding to the notification of completion by the dedicated worker thread;
   determining by the dedicated worker thread whether the request described in the request object is complete; and
   upon determination that the request is complete, sending a message from the dedicated worker thread to least one of the one or more virtual user threads indicating that the request is complete.

4. The method of claim 2 further comprising the steps of:
   retrieving the request object corresponding to the notification of completion by the worker thread;
   determining by the dedicated worker thread whether the request described in the request object is complete; and
   upon determination that the request is not complete, sending a second non-blocking function call from the dedicated worker thread to the networking module.

5. The method of claim 1 wherein the request object further includes information identifying the one or more virtual user threads.

6. The method of claim 1 wherein the data structure is a queue.

7. A computer implemented system for facilitating network communications from one or more virtual user threads, comprising:
   a computer having a processor, a memory device, and a network device; and
   a computer-readable storage medium encoded with a computer program, the computer program comprising:
   a network module configured to execute non-blocking networking function calls through the network device;
   one or more request objects, each of the one or more request objects storing information describing a request for an outgoing network operation and state information;
   a data structure configured to store the one or more request objects;
   one or more virtual user threads, each of the one or more virtual user threads simulating a computer that is communicating with a server and being configured to generate and then insert the one or more request objects into the data structure; and
   a worker thread, different from the one or more virtual user threads, configured to retrieve a request object from the data structure, modify the state of the request object and send a non-blocking function call to the networking module, wherein the networking module is configured to store a notification of completion in a data structure configured to store the request object, the notification of completion being associated with the request object.

8. The system of claim 7, wherein the data structure is a queue.

9. The system of claim 7, wherein the worker thread is further configured to send the request object to the networking module.

10. The system of claim 7, wherein the data structure is further configured to receive the notification of completion from the networking module and store the notification of completion.

11. A computer implemented system for testing a server comprising:
    a computer having a processor, a memory device, and a network device; and
    a computer-readable storage medium encoded with a computer program, the computer program comprising:
    a networking module connected to the server over a computer network through the network device;
    one or more request objects, each of the one or more request objects storing information describing a request for an outgoing network operation and state information;
    one or more virtual user threads, each virtual user thread simulating a computer that is communicating with the server and configured to generate and then insert at least one of the one or more request objects into the data structure;
    a worker thread, different from the one or more virtual user threads, configured to retrieve a request object from the data structure, modify the state of the request object and send a non-blocking function call to the networking module, wherein the networking module is configured to store a notification of completion in a data structure configured to store the request object, the notification of completion being associated with the request object.

12. The system of claim 11, wherein the data structure is a queue.

13. The system of claim 11, wherein the worker thread is further configured to retrieve the notification of completion from the data structure and to retrieve the request object associated with the notification of completion.

14. The system of claim 13, wherein the worker thread is further configured to determine whether the request for the outgoing network operation is completed, based on the request object and the notification of completion.

* * * * *